(12) United States Patent
Benko et al.

(10) Patent No.: US 9,016,857 B2
(45) Date of Patent: Apr. 28, 2015

(54) MULTI-TOUCH INTERACTIONS ON EYEWEAR

(71) Applicant: Microsoft Corporation, Redmond, WA (US)

(72) Inventors: Hrvoje Benko, Seattle, WA (US); Timothy Scott Saponas, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 200 days.

(21) Appl. No.: 13/707,286

(22) Filed: Dec. 6, 2012

(65) Prior Publication Data

US 2014/0160424 A1 Jun. 12, 2014

(51) Int. Cl.
*G02C 1/00* (2006.01)
*G02C 11/00* (2006.01)
*G06F 1/16* (2006.01)
*G06F 3/01* (2006.01)
*G06F 3/0488* (2013.01)

(52) U.S. Cl.
CPC ............... *G02C 11/10* (2013.01); *G06F 1/163* (2013.01); *G06F 3/012* (2013.01); *G06F 3/04883* (2013.01); *G06F 2203/04104* (2013.01)

(58) Field of Classification Search
USPC ........ 351/158, 44, 49, 111, 121, 41; 345/7, 8, 345/173, 174; 381/381, 375
See application file for complete search history.

(56) References Cited

U.S. PATENT DOCUMENTS

| | | | |
|---|---|---|---|
| 7,874,666 B2 * | 1/2011 | Xu et al. | 351/44 |
| 8,184,067 B1 | 5/2012 | Braun et al. | |
| 8,203,502 B1 * | 6/2012 | Chi et al. | 345/7 |
| 8,217,856 B1 | 7/2012 | Petrou | |
| 8,223,088 B1 | 7/2012 | Gomez et al. | |
| 8,744,113 B1 * | 6/2014 | Rickards | 381/381 |
| 2005/0162402 A1 | 7/2005 | Watanachote | |
| 2006/0238517 A1 | 10/2006 | King et al. | |
| 2008/0150906 A1 | 6/2008 | Grivna | |
| 2008/0165140 A1 | 7/2008 | Christie et al. | |
| 2008/0180399 A1 | 7/2008 | Cheng | |
| 2010/0110368 A1 | 5/2010 | Chaum | |
| 2011/0007029 A1 | 1/2011 | Ben-David | |
| 2011/0267309 A1 | 11/2011 | Hanauer et al. | |

OTHER PUBLICATIONS

"International Search Report & Written Opinion for PCT Patent Application No. PCT/US2013/072682", Mailed Date: Feb. 27, 2014, Filed Date: Dec. 2, 2013, 8 Pages.

Kim, et al., "A Highly Sensitive Capacitive Touch Sensor Integrated on a Thin-Film-Encapsulated Active-Matrix OLED for Ultrathin Displays", In Proceedings of IEEE Transactions on Electron Devices, vol. 58, Issue 10, Oct. 2011, pp. 3609-3615.

(Continued)

*Primary Examiner* — Hung Dang
(74) *Attorney, Agent, or Firm* — Jeremy Snodgrass; Judy Yee; Micky Minhas

(57) ABSTRACT

The subject disclosure is directed towards eyewear configured as an input device, such as for interaction with a computing device. The eyewear includes a multi-touch sensor set, e.g., located on the frames of eyeglasses, that outputs signals representative of user interaction with the eyewear, such as via taps, presses, swipes and pinches. Sensor handling logic may be used to provide input data corresponding to the signals to a program, e.g., the program with which the user wants to interact.

20 Claims, 10 Drawing Sheets

(56) References Cited

OTHER PUBLICATIONS

Schoning, et al., "Poster: Inter-Scopic Multi-Touch Surfaces: Using Bimanual Interaction for Intuitive Manipulation of Spatial Data", In Proceedings of IEEE Symposium on 3D User Interfaces, Mar. 14, 2009, pp. 127-128.

Chang, Janie, "Two Extremes of Touch Interaction", Published on: Oct. 17, 2011, Available at: http://research.microsoft.com/en-us/news/features/touch-101711.aspx, 6 pages.

Chung, et al., "Mirror Track—A Real-Time Multiple Camera Approach for Multi-touch Interactions on Glossy Display Surfaces", In Proceedings of 37th IEEE Workshop on Applied Imagery Pattern Recognition Workshop, Oct. 15, 2008, pp. 1-5.

* cited by examiner

MULTI-TOUCH INTERACTIONS ON EYEWEAR

BACKGROUND

As computer and video technology evolves, users need to interface with computers in convenient ways. One way is with head-worn augmented reality glasses, in which the user sees displayed content rendered on the glasses.

However, in scenarios with head-worn augmented reality glasses (continuous use scenarios), interactivity is constrained by the inability to have an input device continuously available in the user's hand. While it is possible to use hand gestures or voice commands in those situations, this necessitates cameras and/or microphones, and may not be appropriate in many situations such as libraries where speech and even silent gestures may be distracting to others.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards using eyewear as an input device, in which the eyewear includes a multi-touch sensor set comprising one or more multi-touch sensors configured to sense user interaction with the eyewear and output signals representative of the user interaction. The multi-touch sensor set may be coupled to sensor handling logic to provide input data corresponding to the signals to a program.

In one aspect, user interaction with a multi-touch eyewear sensor set is sensed. Signals representative of the interaction are output, to provide user interaction with an interactive program. Example user interaction that may be sensed includes a tap or press-and-hold detected at a sensor, a swipe gesture detected via one or more sensors, and/or a pinch detected at a sensor.

In one aspect, information corresponding to user input activity sensed via an eyewear sensor set is received. The information is processed into at least one input event, with data corresponding to the input event buffered, e.g., for consumption by a program to determine a meaning that changes a current state of a program or device.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards making the frames or other areas of glasses or a similar eyewear device touch-sensitive for use in interfacing with a computer system. Any or all of the surface area of the frames, and/or the glass surface, may be touch-sensitive for touch interactions, such as by combining capacitive and/or resistive touch sensors molded directly into the frames, or affixed thereto. Further, dedicated areas on the eyewear such as the location behind the ears, or the spot on the frame between the lenses may be used for additional functionality, (e.g., detecting whether the user is currently wearing the glasses). Biometric sensors may be built into the frames for sensing different usage states.

Also described are various interaction techniques that provide for numerous types of possible interactions. One or more of these techniques may be combined with input from other input devices such as wireless remotes, three-dimensional (3D) pointers, mobile phones, and so forth, to provide for further or modified interaction. The input received via the eyewear may be used and/or combined with other input data, such as obtained via eye-tracking and/or head-tracking, to modify and/or provide additional input information.

It should be understood that any of the examples herein are non-limiting. For instance, while glasses are used as an example, any other type of eyewear may benefit from the technology described herein, and the eyewear may be of any type, including but not limited to eyeglasses having corrective lenses, 3D (stereoscopic) glasses, safety glasses, sunglasses, reading glasses, glasses with active shutters, goggles and so forth. Thus, the eyewear may be, but need not be, augmented reality glasses (near-eye displays) that display interactive content; the eyewear alternatively may be any type of glasses or goggles, including lenses through which a user may view any type of content with which he or she wishes to interact, regardless of how displayed. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computers and face detection in general.

Figure 1:
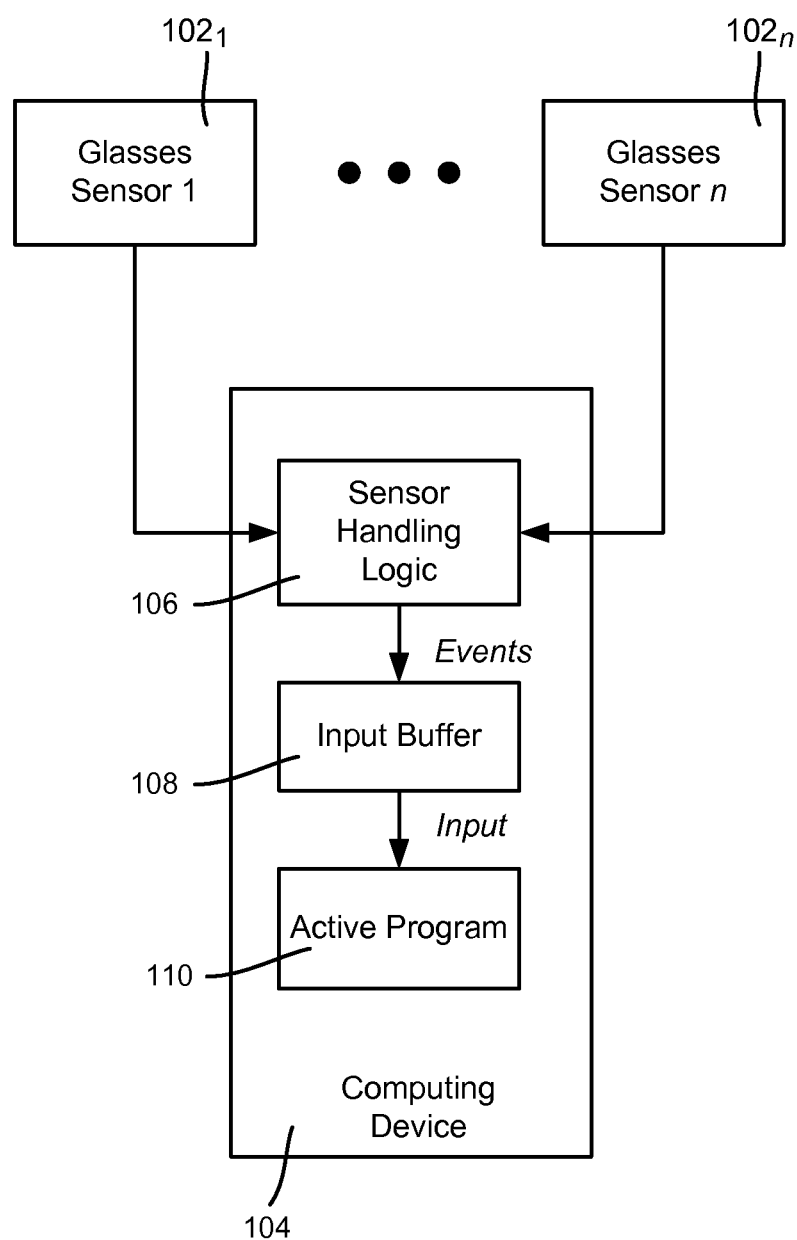
FIG. 1 is a block diagram including components configured to transmit eyewear-sensed interaction as signals to a computing device, according to one example embodiment.

FIG. 1 is a block diagram showing an example implementation of how eyewear, exemplified as "glasses" herein for purposes of explanation, contain a set of one or more multi-touch sensors $102_1$-$102_n$ that couple to a computing device 104. As used herein, "multi-touch" refers to sensors that provide more than a single sensor's on-off state. That is, a multi-touch sensor set is able to provide information on the states of more than one individual sensor, and/or location data indicating where a single sensor (or multiple sensors) has been triggered among a plurality of possible triggering locations, e.g., possibly as granular as one or more coordinates.

The computer system 104 may be a personal computer, smartphone, slate/tablet, a heads up display, and appliance (e.g., a television), an inter-cranial/ocular and/or other device built into the body. Essentially any device with which a user wishes to controllably interact is suitable for use with the technology described herein.

The sensors $102_1$-$102_n$ may be capacitive sensors, resistive (potentiometer) sensors, piezo-electric-based, optical, light-based (e.g., infrared), reflective (emitter/detector)-based and/or any other type of sensor that detects contact and/or proximity (e.g., hover) of a finger or other suitable pointing mechanism. The entire surface area of the frames and/or lens, or something less than the entire area, may be touch sensitive. The sensors may be embedded into the frame and/or lens material, or a coating applied thereto. The application may determine a suitable sensor type, e.g., a waterproof sensor, a sensor that detects interaction at a relatively larger distance (e.g., reflective at near the user's arm's length), and so on.

The sensors may be individual sensors and/or arranged as an array, e.g., such that taps, presses, swipes and so forth may be sensed and differentiated from one another. Some of the sensors may be inward facing, e.g., a user wearing a set of 3D glasses may be recognized as one profile, whereby his viewing and audio preferences may be applied instead of the preferences applied when his daughter wears the same pair of glasses.

The sensors may be pressure sensitive, so that a hard tap, hard squeeze, soft tap and soft squeeze may each have different meanings in an interactive vocabulary. Note that unlike conventional sensors such as on touch-sensitive displays screens, squeezing is possible because a user can pinch the sensor between a thumb and finger using the opposite side of the frame to oppose the sensor pressure, for example.

The input detected by the sensors, or data corresponding to the input, is processed by sensor handling logic 106. Any type of communication is feasible from the sensors to the signals that processed by sensor handling logic 106, e.g., via wired or wireless communication. A power source may be incorporated into the glasses or coupled to the sensors where no communication wire is available. The signals received and/or processed by the sensor handling logic 106 may be passed through any number of zero or more intermediaries such as amplifiers, analog-to-digital converters, modulators, demodulators and so forth, which may be external to the sensor handling logic 106, or considered part thereof.

In general, the sensor handling logic may process the user input into events (e.g., pointer events) into a buffer 108 for consumption by an active program 110. The buffer may contain click events, coordinates, timestamps and so forth corresponding to events entered via other types of pointing devices and the like. As mentioned above, different pressures may provide different input, as may different timing considerations, e.g., a press-and-hold may differ from a tap. As can be readily appreciated, in this way a user may interact with the active program via human activity sensed at the sensors $102_1$-$102_n$ associated with the glasses.

Figure 2A:
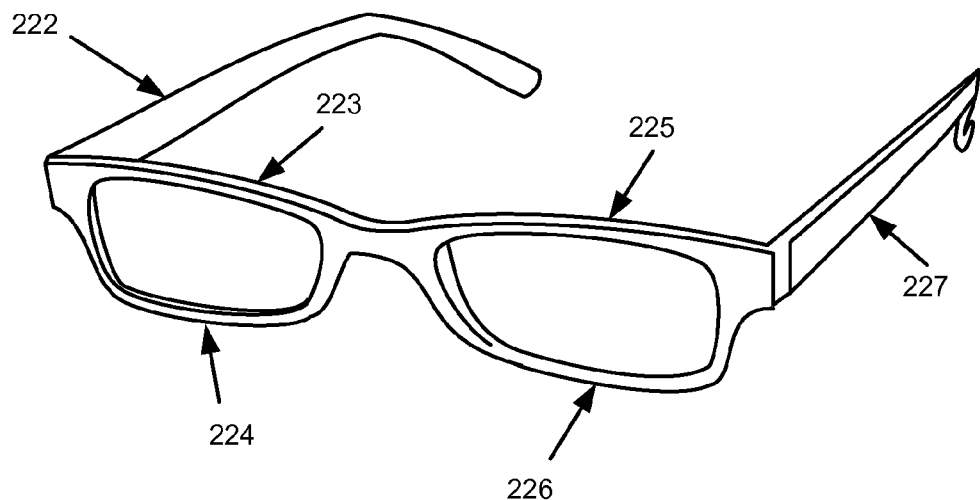
FIGS. 2A and 2B are representations of locations where sensors may be located on eyewear, according to one example embodiment.
Figure 2B:
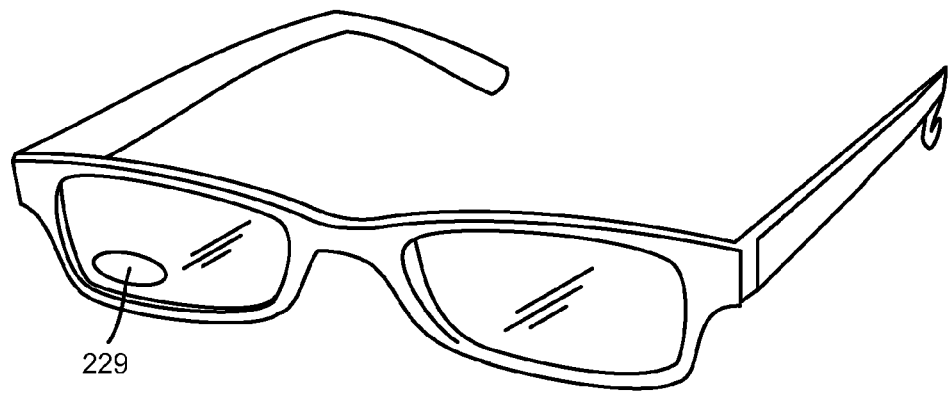

FIGS. 2A-8 are representations of how some interactions may take place with multi-touch sensitive sensors located on a surface of the glasses frames, and/or the lens (FIG. 2B). As is understood, the glasses and depicted sensors of FIGS. 2A-8 are only intended to be illustrative examples, and the actual locations, shapes and/or sizes of the depicted sensors are not intended to be representative of any specific implementations nor limiting in any way.

In FIG. 2A, various possible sensing points 222-227 corresponding to sensors are shown, including on the frames portions 223-226 that hold the lenses, and on the earpiece stems 222 and 227. In FIG. 2B, a sensor 229, which may be transparent, is shown on one lens. The entire lens area may be multi-touch-sensitive, and both lenses may contain one or more sensors. Note that touching the lens itself may not be ideal for types of glasses that users look through because of smudges that will occur in the viewing area, however certain scenarios an applications, as well as the use of proximity sensing rather than contact sensing may benefit from sensing via the lens itself.

Figure 3A:
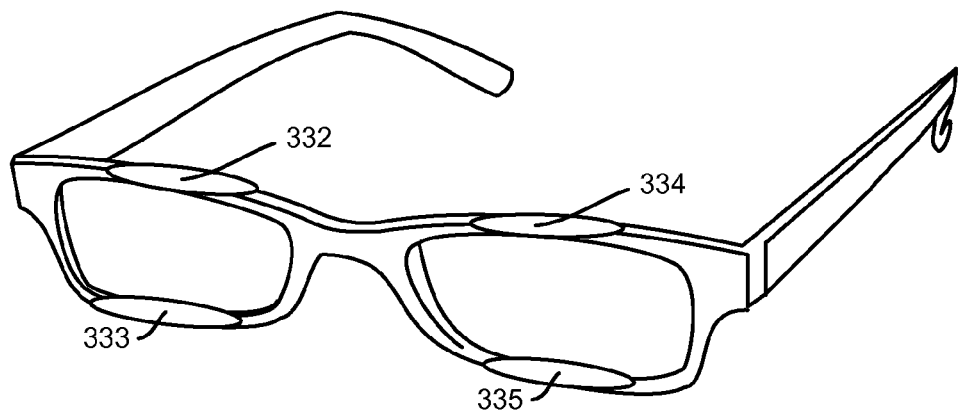
FIGS. 3A and 3B are representations of eyewear-based sensors and types of possible interaction therewith, according to one example embodiment.

FIG. 3A represents a plurality of sensors 332-335 positioned above and below the lenses of a pair of eyeglasses. Such sensors 332-335 may be individual single touch sensors. As can be readily appreciated, which sensor is actuated may have different interactive meanings.

Figure 3B:
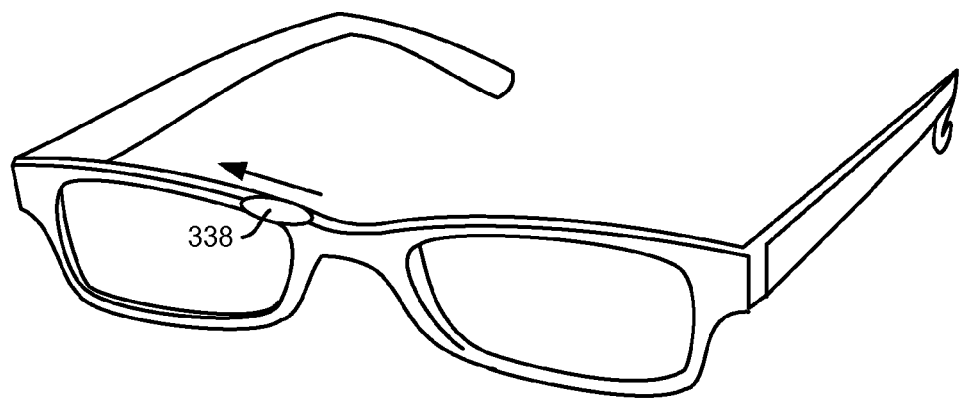

FIG. 3B represents a sensor 338 configured to sense actuation via contact/proximity or a one-dimensional swipe. A single swipe direction may be the only swipe direction allowed for interaction, or two swipe directions may be allowed, each with the same meaning or independent meanings with respect to user intent. For example, a user viewing video content may swipe right-to-left on the sensor 338 for rewind, left-to-right for fast forward, or tap the sensor 338 for play; (note that a tap need not require physical contact, e.g., a finger that is briefly in close proximity to a proximity-type sensor and then removed may actuate the sensor as a "tap" without ever making physical contact). As another example, zoom-in or zoom-out with a camera-type application may be controlled via swipe interaction.

Figure 4A:
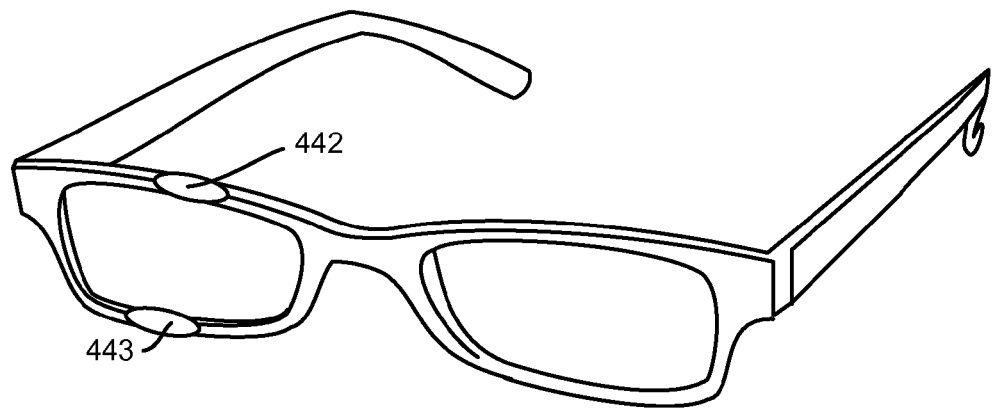
FIGS. 4A and 4B are representations of eyewear-based sensors for one-handed use and two-handed use, respectively, according to one example embodiment.

FIG. 4A is a representation of how two sensors 442 and 443 may be used together with single hand interaction. Contact/close proximity at the top sensor 442 may have one meaning, at the bottom sensor 443 another meaning, or both actuated together have a third meaning. Timing mechanisms and the like, such as implemented in the sensor handling logic 106, may be used to allow the user to be slightly inexact in actuating the sensors together. Double-taps and triple-taps or the like may have yet another set of meanings. Swipes also may be used with such a pair of sensors.

Figure 4B:
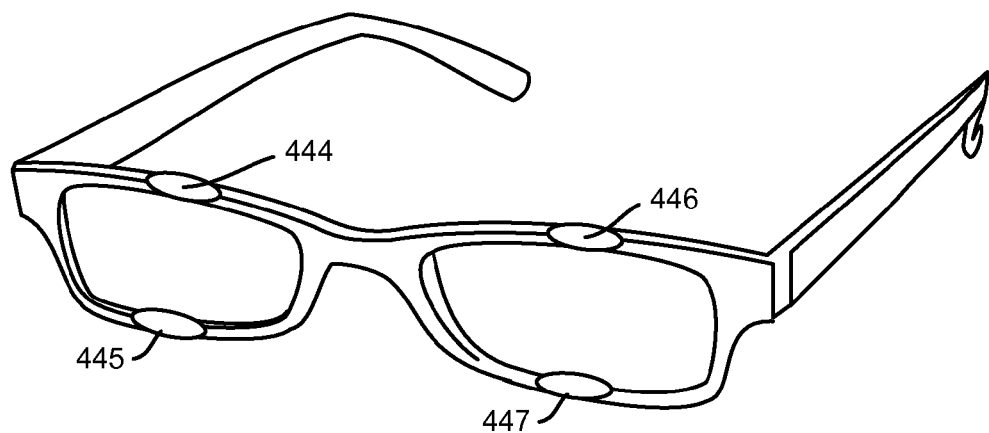

FIG. 4B is similar to FIG. 4A, but has left, right, upper and lower sensors 444-447, such as for two-handed operation. As can be readily appreciated, the number of possible combinations allows for more interactive meanings.

Figure 5A:
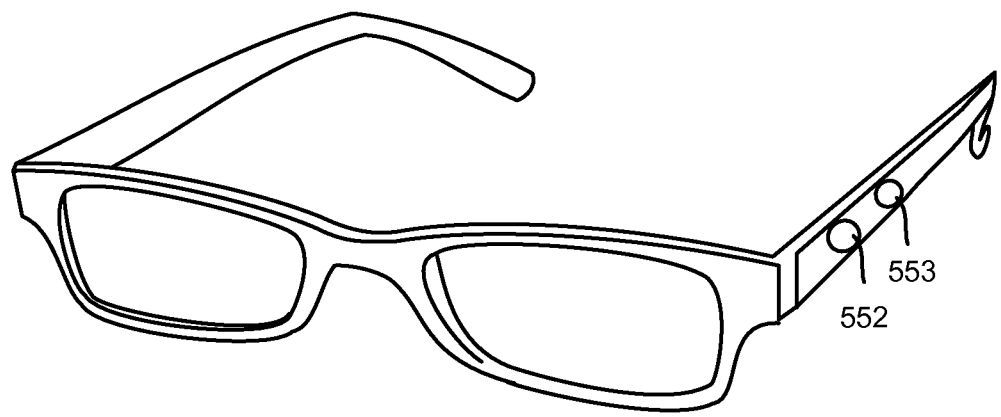
FIGS. 5A and 5B are representations of locations where sensors may be located on eyewear stems, and possible interaction therewith, according to one example embodiment.
Figure 5B:
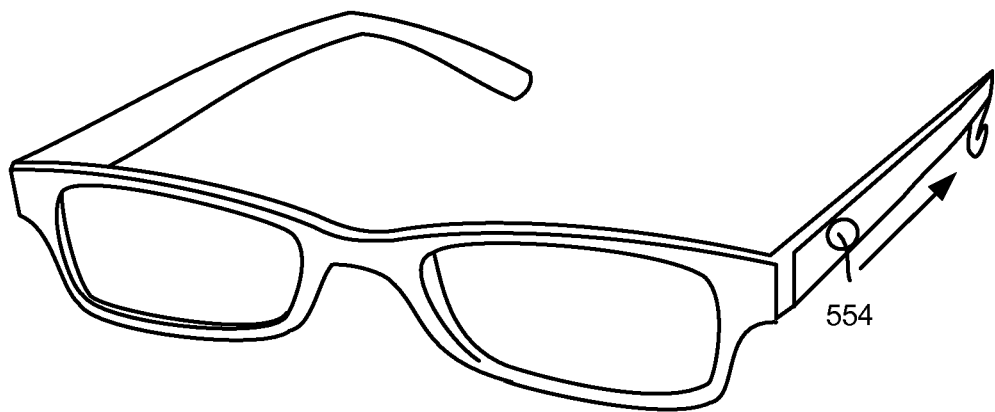
Figure 6A:
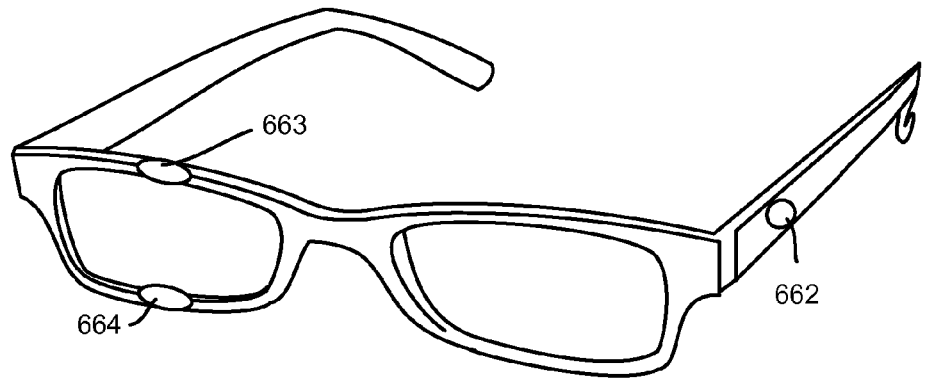
FIGS. 6A and 6B are representations of locations where sensors may be located on eyewear stems, for possibly more complex interaction therewith, according to one example embodiment.

FIGS. 5A and 5B represent sensors 552-554 on the stem portions of the glasses frames. The sensors may be single on-off sensors 552 and 553 (which can also detect swipes via timing), or may detect swipes directly (sensor 554 of FIG. 5B). As can be readily appreciated, multiple swipe-capable sensors may be used, although not explicitly represented, and both the left and right eyewear stems may contain sensors. FIG. 6A exemplifies a combination of a stem-located sensor 662 and sensors 663 and 664 located near one lens, which for example provides for a two-hand hybrid model. As can be readily appreciated, any number of stem-located sensors and/ or sensors near a lens, (and/or even on the lens itself), may be implemented, with any number of individual and combined meanings.

Figure 6B:
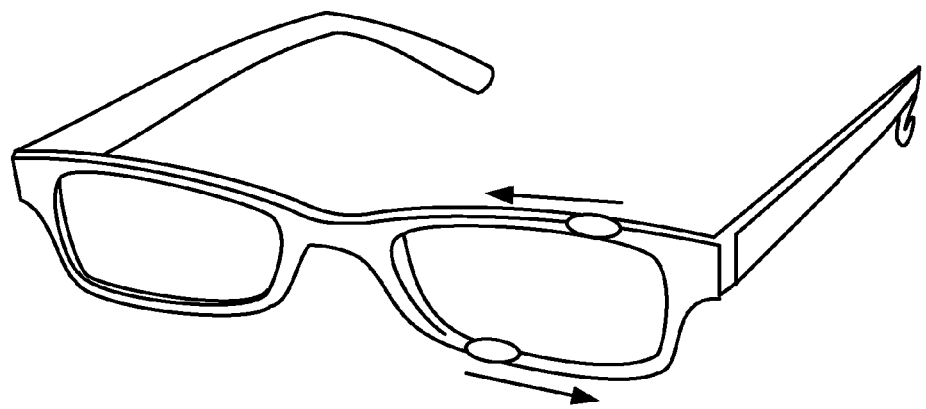

FIG. 6B is a representation of a more complex type of interaction, in which opposing swipes have yet another meaning, e.g., providing a rotation-like aspect. Applications with zoom-in versus zoom-out offerings, focus and so forth may benefit from this type of gesture.

Figure 7A:
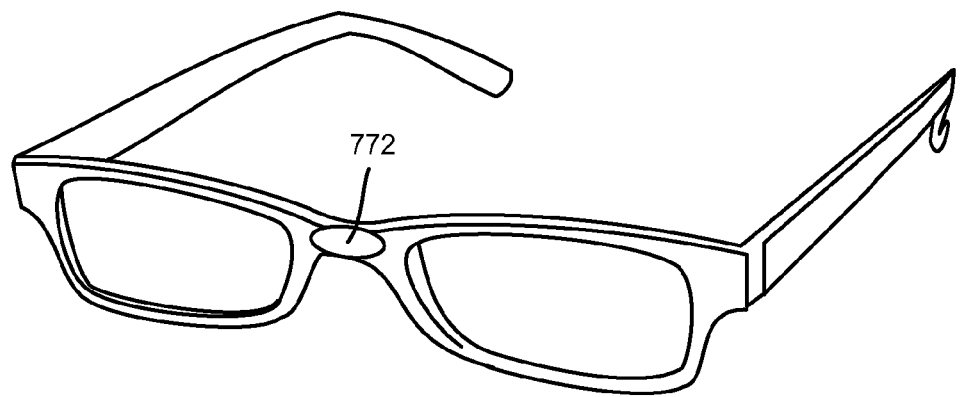
FIGS. 7A and 7B are representations of locations where sensors, which may be touch-sensitive and/or biometric sensors, may be located on eyewear, according to one example embodiment
Figure 7B:
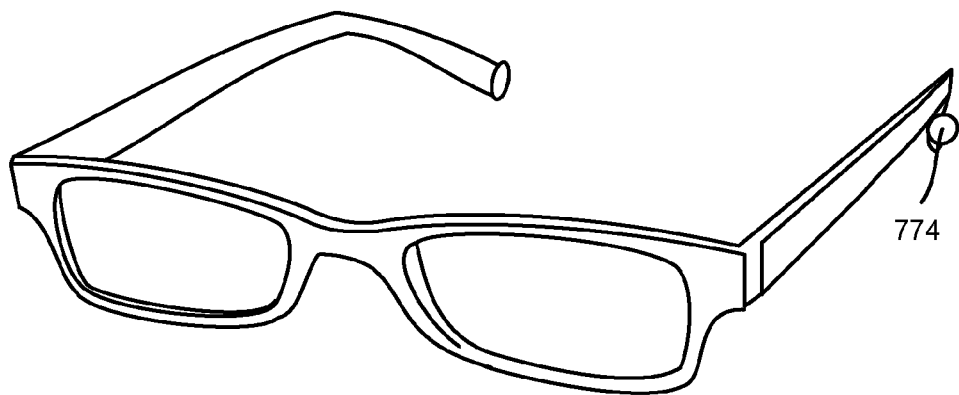

FIGS. 7A and 7B represent another example aspect, namely a sensor 772 between the eyes and a sensor 774 at the very tip, behind the ear (when worn), respectively. Such sensors may be used for touch sensing, e.g., to access some features in a user interface. However, the exemplified sensors 772 and/or 774 may be used for other purposes, including when such sensors 772 and/or 774 are not necessarily touch-sensitive sensors. For example, via one or more types of biometric and/or other sensing, the frames may automatically "know" whether they are being worn on the head or not by sensing touches (i.e., skin contact) around the nose and ears as in FIGS. 7A and 7B. Temperature sensing is one way to possibly detect whether the eyewear is being worn, particularly if compared to ambient temperature measured elsewhere. Capacitive sensing can also detect deformations in the nearby skin, which, for example, may be used to detect certain types of facial expressions such as raising or furrowing eyebrows. Sensing of whether the eyewear is being currently worn or not may be used for turning off the displays in the eyewear when the eyewear are not in use, and automatically turning the system back up when in use; note that some logic or circuitry may be built into the eyewear to act upon such a state change. Such locations also may be used as points that sense touch-sensitive interaction.

Moreover, touch/proximity/other sensors embedded in the eyewear also may be used for collecting biometric data that may be used for purposes beyond knowing whether the glasses are currently being worn or not. For example, one or more sensors may sense galvanic skin response, provide electrocardiogram (EKG) signals, detect heart rate and so forth, such as by looking at two or more different sensors (e.g., electrodes) on different sides of the head (e.g., behind the wearer's ears).

The touch sensing may be combined with inertial sensing or the like in the eyewear, such as to use a combination of sensing input to determine whether the user is currently holding the glasses and moving them, versus interacting via the eyewear. For example, one or more movement (e.g., inertial) sensors may detect an amount of movement indicative of more than head movement, to distinguish other such actions, as opposed to when the eyewear is relatively stable and the touches are being used for interactions. In this way, with "always on" interfaces or the like, such input may be used to differentiate between recognizing intentional interactive gestures versus detecting actions such as holding and adjusting the eyewear to achieve a better/more comfortable fit.

Figure 8:
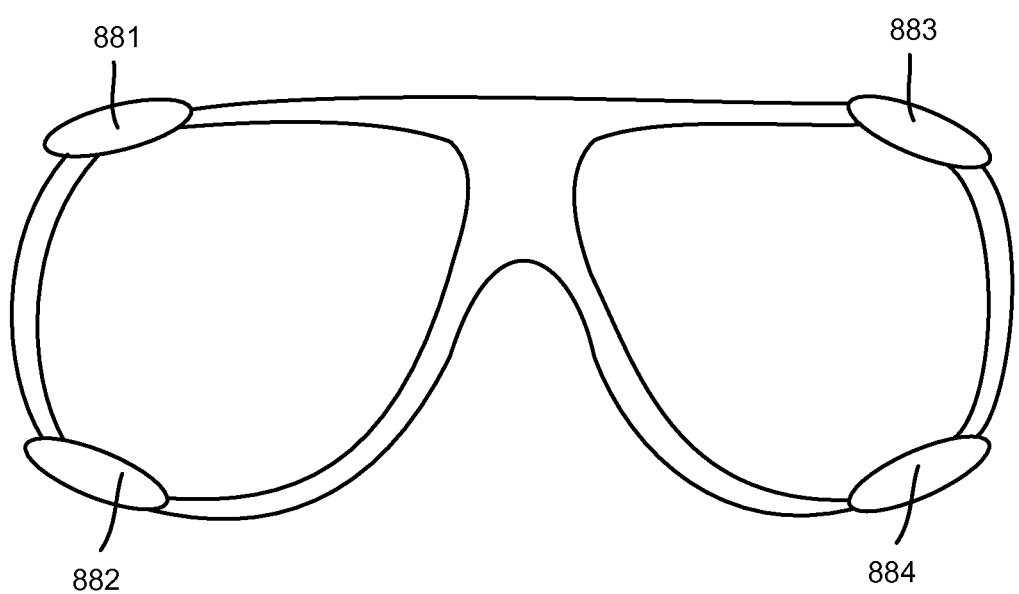
FIG. 8 is a representation of eyewear-based sensors mapped to desired input functionality, according to one example embodiment.

FIG. 8 shows an example of a displayed user interface associated with glasses, in which each of four options may be activated simply by touching the frames at the area at or closely nearby the sensors 881-884. For example, when actuated, the sensor 881 may leave a "crumb" (a UI navigation tracking aid), while the sensor 882 starts or stops a recording when actuated. The sensor 883 may be used to invoke a search engine or other search mechanism. The sensor 884 may be used to control windows via a snap feature. Any other functions, commands and so forth may be assigned to such sensors, which may be user customized and/or dependent on the (e.g., operating system or application program) with which the user is interfacing, for example.

In this way, the glasses with multi-touch sensors may be used as a remote input device to other devices, e.g., mobile phones, computers and the like. The glasses may function as wireless remotes, 3D pointers, and so forth.

Turning to another aspect, combinations of glasses-based input with the input of other input devices provides for various useful interaction scenarios. By way of example, consider that a user is known via head tracking or eye tracking to be looking at a television. In that instance, the sensors on the glasses may be used to interact with the television, such as to control the volume, channel changing and so forth. If the user then turns to a computer display screen, the sensors on the glasses may be used to interact with the computer. Speech, gestures, and more conventional input such as mouse or keyboard input may benefit from interaction via glasses-based input.

Moreover, the touch-sensitive glasses may be combined with other sensors also built into the glasses, such as sensors for eye tracking, cameras, inertial sensors, jaw tracking, temperature sensors, heart-rate monitors, galvanic skin response, EEG, EMG, EKG, and the like. Such additional sensors may provide, for example, an always-on input-output solution in health monitoring, as well as with 3D input (e.g., when combined with eye gaze monitoring, inertial sensors, or cameras). When combined with cameras/inertial sensors/microphones/gaze tracking and/or the like, these glasses may be used to enable gaze-directed visual search or augmented reality videos, for example.

Figure 9:
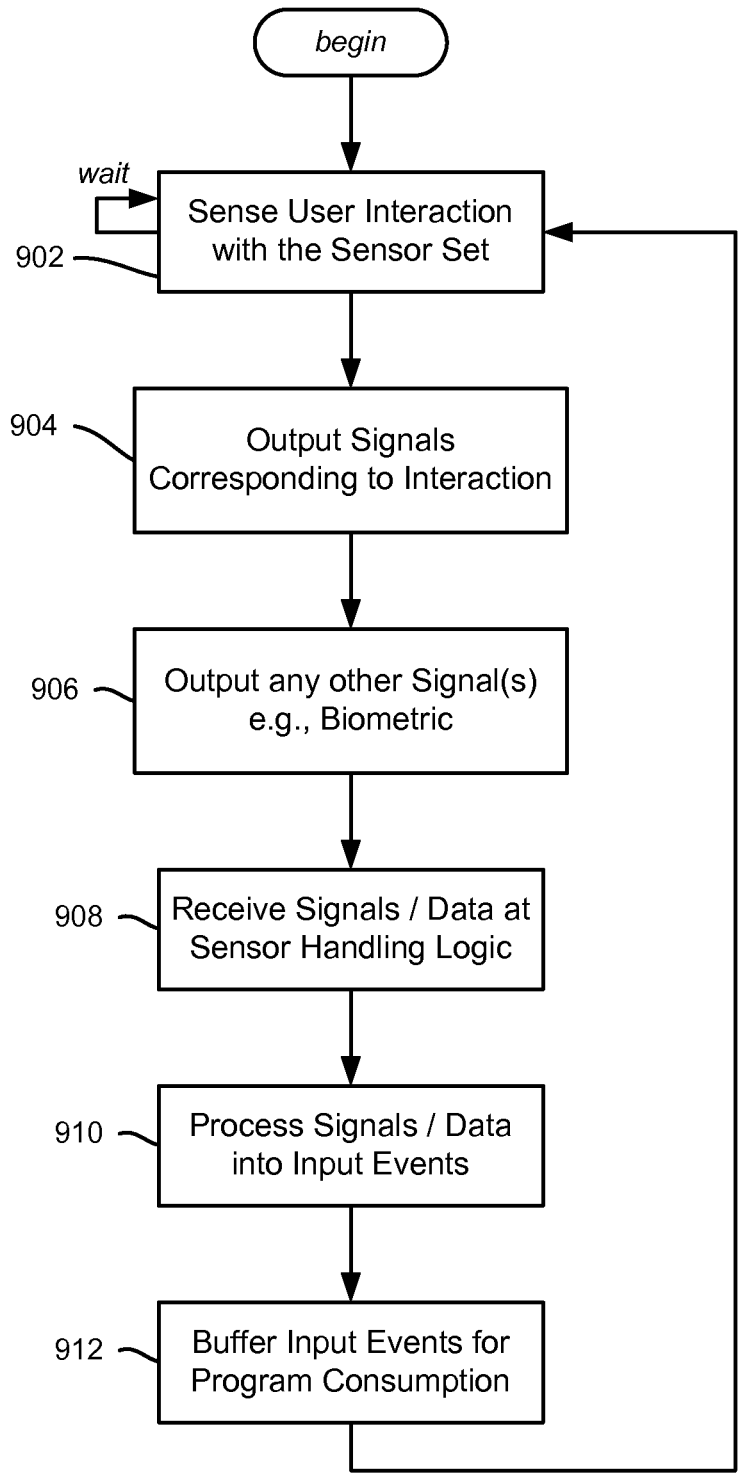
FIG. 9 is a flow diagram showing example steps that may be taken to use eyewear as an input device, according to one example embodiment.

FIG. 9 is an example flow diagram summarizing example steps that may be performed to use eyewear as an interactive input device, beginning at step 902 when user interaction is detected by the multi-touch sensor set. Step 904 represents outputting signals corresponding to the interaction.

Step 906 represents outputting any other signals, such as obtained by biometric sensors. Note that in this simplified example, step 906 is shown as being output whenever interaction is sensed; alternatively, however, such biometric or other signaling may be part of a separate process, such as one that samples once per second and/or outputs only when there is a substantial state change detected. Further, the other signaling may be internal to the glasses, e.g., to turn active glasses off when not in use or on when in use.

Steps 908 and above are directed towards actions at the receiving end of the signals or (data corresponding thereto, such as digitized and/or demodulated data corresponding to the signals). Steps 908 and 910 represent receiving the signals or corresponding data and processing the data into a form suitable for consumption by the program with which the user is interacting, e.g., pointer events such as clicks and coordinates.

Step 912 represents buffering the input events for the program. Note that as described above, the program may switch based upon other state information, such as whether the user is looking at a television or a computer monitor, whereby different buffers or the like (e.g., timestamp based routing), each associated with a program, may be used. Feedback associated with the user input may be provided, not only in the form of a visible change in the UI or other direct change (such as an increase in audio volume), but possibly as additional feedback, e.g., a vibration or other tactile feedback to let the user know that the input was received, which may be particularly useful if not readily apparent to the user.

Exemplary Operating Environment

Figure 10:
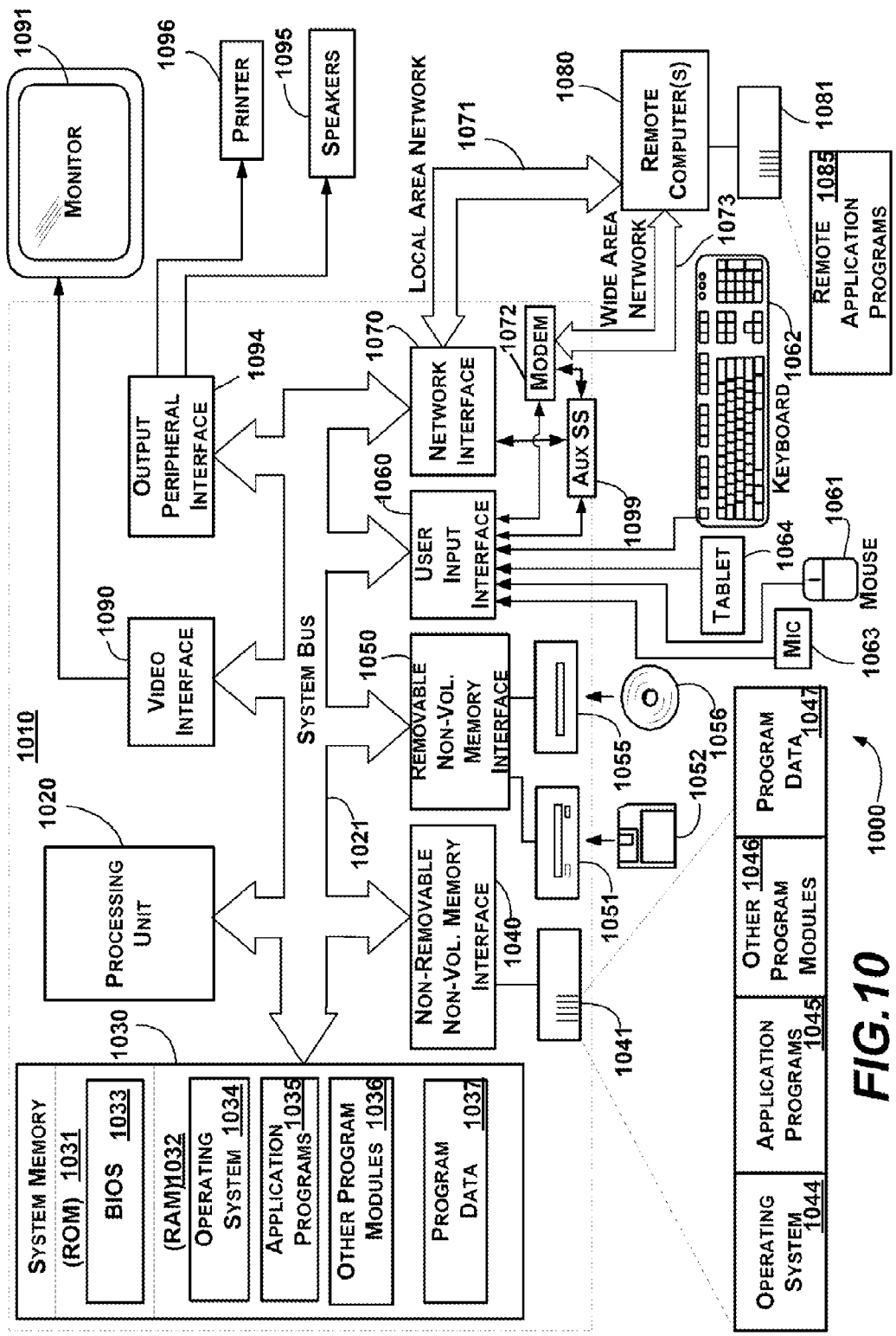
FIG. 10 is a block diagram representing an example computing environment, into which aspects of the subject matter described herein may be incorporated.

FIG. 10 illustrates an example of a suitable computing and networking environment 1000 on which the examples of FIGS. 1-9 may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 10, an exemplary system for implementing various aspects of the invention may include a general purpose computing device in the form of a computer 1010. Components of the computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer-readable media. Computer-readable media can be any available media that can be accessed by the computer 1010 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1010. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036 and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media, described above and illustrated in FIG. 10, provide storage of computer-readable instructions, data structures, program modules and other data for the computer 1010. In FIG. 10, for example, hard disk drive 1041 is illustrated as storing operating system 1044, application programs 1045, other program modules 1046 and program data 1047. Note that these components can either be the same as or different from operating system 1034, application programs 1035, other program modules 1036, and program data 1037. Operating system 1044, application programs 1045, other program modules 1046, and program data 1047 are given different numbers herein to illustrate that, at a minimum, they are different copies. A user may enter commands and information into the computer 1010 through input devices such as a tablet, or electronic digitizer, 1064, a microphone 1063, a keyboard 1062 and pointing device 1061, commonly referred to as mouse, trackball or touch pad. Other input devices not shown in FIG. 10 may include a joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. The monitor 1091 may also be integrated with a touch-screen panel or the like. Note that the monitor and/or touch screen panel can be physically coupled to a housing in which the computing device 1010 is incorporated, such as in a tablet-type personal computer. In addition, computers such as the computing device 1010 may also include other peripheral output devices such as speakers 1095 and printer 1096, which may be connected through an output peripheral interface 1094 or the like.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include one or more local area networks (LAN) 1071 and one or more wide area networks (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060 or other appropriate mechanism. A wireless networking component such as comprising an interface and antenna may be coupled through a suitable device such as an access point or peer computer to a WAN or LAN. In a networked environment, program modules depicted relative to the computer 1010, or portions thereof, may be stored in the remote memory storage device. By way of example, and not limitation, FIG. 10 illustrates remote application programs 1085 as residing on memory device 1081. It may be appreciated that the network connections shown are exemplary and other means of establishing a communications link between the computers may be used.

An auxiliary subsystem 1099 (e.g., for auxiliary display of content) may be connected via the user interface 1060 to allow data such as program content, system status and event notifications to be provided to the user, even if the main portions of the computer system are in a low power state. The auxiliary subsystem 1099 may be connected to the modem 1072 and/or network interface 1070 to allow communication between these systems while the main processing unit 1020 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising, eyewear configured as an input device, the eyewear including a multi-touch sensor set comprising one or more multi-touch sensors configured to sense user interaction with the eyewear and output signals representative of the user interaction, the multi-touch sensor set including at least one inward facing sensor to recognize a profile of a user of the eyewear, the multi-touch sensor set coupled to sensor handling logic to provide input data corresponding to the signals to a program, and applying preferences corresponding to the recognized profile for interacting with the program.

2. The system of claim 1 wherein the multi-touch sensor set comprises at least one sensor configured to detect a swipe gesture.

3. The system of claim 1 wherein the multi-touch sensor set comprises at least one sensor configured to detect a plurality of different pressures.

4. The system of claim 1 wherein the eyewear comprises augmented reality glasses, near-eye displays, eyeglasses having corrective lenses, stereoscopic glasses, safety glasses, sunglasses, reading glasses, glasses with active shutters or goggles.

5. The system of claim 1 wherein the multi-touch sensor set comprises at least one of: a capacitive sensor, a resistive sensor, a piezo-electric-based sensor, an optical sensor, a light-based sensor, or a reflective sensor.

6. The system of claim 1 wherein at least part of the multi-touch sensor set is molded into frames of the eyewear, or affixed to the frames of the eyewear, or both molded into frames of the eyewear and affixed to the frames of the eyewear.

7. The system of claim 1 wherein at least part of the multi-touch sensor set is located on a lens of the eyewear.

8. The system of claim 1 wherein at least part of the multi-touch sensor set is located on a frame above a lens of the eyewear, on a frame below a lens of the eyewear, or both.

9. The system of claim 1 wherein at least part of the multi-touch sensor set is located on a stem of the eyewear.

10. The system of claim 1 further comprising at least one sensor that is configured to provide signals used to determine whether the eyewear is currently being worn by a user.

11. The system of claim 1 further comprising at least one sensor that is configured to provide signals used to differentiate whether the eyewear is currently being moved by a user versus being used as an input device by the user.

12. The system of claim 1 further comprising another input device, the program operating based upon input initiated at the multi-touch sensor set and input initiated at the other input device.

13. The system of claim 1 wherein the multi-touch sensor set is coupled to the sensor handling logic at least in part via a wireless medium.

14. A method comprising:
sensing user interaction with a multi-touch eyewear sensor set comprising one or more sensors;
outputting signals representative of the interaction to provide for user interaction with an interactive program;
recognizing a profile of a user using at least one inward facing sensor in the multi-touch eyewear sensor set; and
applying preferences corresponding to the recognized profile for user interaction with the interactive program.

15. The method of claim 14 wherein sensing the user interaction comprises sensing a tap, a press, a pinch, or a swipe gesture, or any combination of signals representative of the tap, the press, the pinch, or the swipe gesture via one or more sensors of the multi-touch eyewear sensor set.

16. The method of claim 14 wherein sensing the user interaction comprises sensing a press-and-hold at a sensor of the multi-touch eyewear sensor set.

17. One or more computer-readable media having computer-executable instructions, which when executed perform steps, comprising:
   receiving information corresponding to user input activity sensed via an eyewear sensor set;
   recognizing a profile of a user using at least one inward facing sensor in the eyewear sensor set;
   processing the information into at least one input event based on the recognized profile of the user; and
   buffering data corresponding to the at least one input event.

18. The one or more computer-readable media of claim 17 having further computer executable instructions comprising, processing at least some of the data corresponding to the at least one input event to determine a meaning, and using the meaning to change a current state of a program or device.

19. The one or more computer-readable media of claim 17 having further computer executable instructions comprising, combining the data corresponding to the at least one input event with input data of another input mechanism.

20. The one or more computer-readable media of claim 17 having further computer executable instructions comprising, outputting signals corresponding to the information from the sensor set, including outputting signals representative of a tap, a press, a pinch, or a swipe gesture, or any combination of signals representative of a tap, a press, a pinch, or a swipe gesture.

* * * * *